(12) United States Patent
Jurkovicts et al.

(10) Patent No.: US 12,107,408 B2
(45) Date of Patent: Oct. 1, 2024

(54) CIRCUIT BREAKER SYSTEM

(71) Applicant: Eaton Intelligent Power Limited, Dublin (IE)

(72) Inventors: Richard Jurkovicts, Vienna (AT); Rainer Meisel, Vienna (AT); Werner Dichler, Niederoesterreich (AT)

(73) Assignee: EATON INTELLIGENT POWER LIMITED

( * ) Notice: Subject to any disclaimer, the term of this patent is extended or adjusted under 35 U.S.C. 154(b) by 25 days.

(21) Appl. No.: 17/567,909

(22) Filed: Jan. 4, 2022

(65) Prior Publication Data

US 2022/0216024 A1 Jul. 7, 2022

(30) Foreign Application Priority Data

Jan. 5, 2021 (GB) .................................. 2100069

(51) Int. Cl.
*H02H 3/00* (2006.01)
*H01H 1/20* (2006.01)
*H02H 3/05* (2006.01)
*H02H 3/08* (2006.01)

(52) U.S. Cl.
CPC .............. *H02H 3/05* (2013.01); *H01H 1/20* (2013.01); *H02H 3/08* (2013.01)

(58) Field of Classification Search
CPC ....... H01H 71/125; H01H 71/082; H01H 1/20
USPC ............................................. 361/68
See application file for complete search history.

(56) References Cited

U.S. PATENT DOCUMENTS

| | | | | |
|---|---|---|---|---|
| 5,905,616 | A * | 5/1999 | Lyke | H02J 3/14 361/64 |
| 6,008,971 | A * | 12/1999 | Duba | H02H 7/30 361/64 |
| 8,604,630 | B2 * | 12/2013 | Folken | H02P 9/006 361/72 |
| 2018/0241193 | A1 * | 8/2018 | Louco | H02H 7/30 |
| 2019/0089343 | A1 | 3/2019 | Brugger et al. | |

* cited by examiner

*Primary Examiner* — Jared Fureman
*Assistant Examiner* — Lucy M Thomas
(74) *Attorney, Agent, or Firm* — LEYDIG, VOIT & MAYER, LTD.

(57) ABSTRACT

A circuit breaker system includes a first circuit breaker and a second circuit breaker. The first circuit breaker has a first trip unit, a first control unit, and a first electrical sensor. The first control unit is configured to control the first trip unit. The second circuit breaker has a second trip unit, a second control unit, and a second electrical sensor. The second control unit is configured to control the second trip unit. The first control unit is in communication with the second control unit. The first control unit is configured to monitor the communication with the second control unit to determine whether there is an internal device failure in the second circuit breaker. The first control unit is configured to change the first control unit's standard tripping characteristics to emergency tripping characteristics based on detecting the internal device failure of the second circuit breaker.

13 Claims, 1 Drawing Sheet

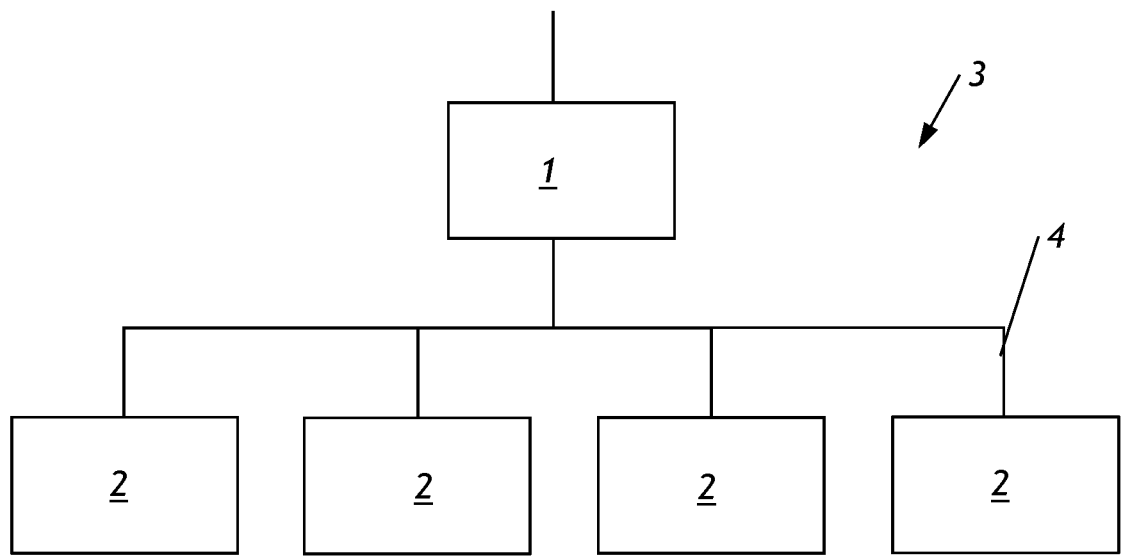

CIRCUIT BREAKER SYSTEM

CROSS-REFERENCE TO PRIOR APPLICATION

Priority is claimed to British Patent Application No. GB 2100069.0, filed on Jan. 5, 2021, the entire disclosure of which is hereby incorporated by reference herein.

FIELD

The present disclosure relates to a circuit breaker system.

BACKGROUND

Conventionally, programmable circuit breakers with processors and different tripping curves are used in different circuit breaker systems. It is common practice that electrical distribution grids comprise circuit breakers located downstream to other circuit breakers.

In case of a defective circuit breaker, for example a miniature circuit breaker (MCB), a hybrid circuit breaker (HCB) or a solid state circuit breaker (SSCB), the system operator could be informed using different methods, for example via an immediate trip or via a failure communication. However, one part of the system would be offline or the safety level would decrease because of this single failure. It could also happen that the tripping isn't possible anymore. In case of a second failure, for example an overcurrent or a residual current, the required failure level to trip the upstream circuit breaker is higher than the original one.

For example, if the MCB detects a tripping condition but can't completely perform the trip because of an internal failure state which it detects along the line after having initiated tripping, then parts of the system could be damaged, if the device still tried to use them for breaking the current flow. Such internal damages could for instance happen in the case that the switch-off semiconductor isn't able to interrupt and the series isolation relay doesn't have the breaking capacity rating for this tripping current in a solid-state circuit breaker or hybrid circuit breaker. Other system components could be damaged too. For instance, the downstream wires could be overheated due to higher currents, because the upstream circuit breaker would trip only after reaching its tripping threshold.

SUMMARY

In an embodiment, the present invention provides a circuit breaker system comprising: a first circuit breaker and a second circuit breaker, the first circuit breaker having a first trip unit, a first control unit and a first electrical sensor, wherein the first control unit is configured to control the first trip unit, the second circuit breaker having a second trip unit, a second control unit and a second electrical sensor, wherein the second control unit is configured to control the second trip unit; and a communication device configured for communication of the first control unit with the second control unit, wherein the first control unit is configured to monitor via the communication device for an internal device failure in the second circuit breaker, wherein the first control unit is configured to change standard tripping characteristics of the first control unit to emergency tripping characteristics based on a detecting of the internal device failure of the second circuit breaker.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 illustrates a preferred embodiment of a circuit breaker system in a schematic view.

DETAILED DESCRIPTION

In an embodiment, the present invention provides a circuit breaker system with which a safe operation is achieved.

In an embodiment, the present invention provides a circuit breaker system that achieves a safe operation. As a result of that the first control unit monitors via means for communication if there is an internal device failure in the second circuit breaker, wherein the first control unit is adapted to change its standard tripping characteristics to emergency tripping characteristics when the internal device failure of the second circuit breaker is detected, an internal device failure can be detected in an effective and fast way and a complete system failure can be avoided. The defective circuit breaker can be prevented from harmfully blowing up and damaging surrounding components in the closure. Therefore, the safety level of the circuit breaker system is not reduced and the overall system uptime can be extended.

In an embodiment, the present invention provides a method for operating a circuit breaker system with which a safe operation is achieved.

The invention is described with reference to the drawing. The drawing illustrates only an exemplary embodiment of the invention.

FIG. 1 illustrates at least a part of a preferred embodiment of a circuit breaker system 3 comprising a first circuit breaker 1 and a second circuit breaker 2, the first circuit breaker 1 having a first trip unit, a first control unit and a first electrical sensor, said first control unit controlling said first trip unit, the second circuit breaker 2 having a second trip unit, a second control unit and a second electrical sensor, said second control unit controlling said second trip unit, the circuit breaker system 3 further comprising means for the communication of the first control unit with the second control unit, wherein the first control unit monitors via said means for communication if there is an internal device failure in the second circuit breaker 2, wherein the first control unit is adapted to change its standard tripping characteristics to emergency tripping characteristics when the internal device failure of the second circuit breaker 2 is detected.

Further, a method for operating a circuit breaker system 3 is provided, the circuit breaker system 3 comprising a first circuit breaker 1 and a second circuit breaker 2, the first circuit breaker 1 having a first trip unit, a first control unit and a first electrical sensor, said first control unit controlling said first trip unit, the second circuit breaker 2 having a second trip unit, a second control unit and a second electrical sensor, said second control unit controlling said second trip unit, wherein the first control unit communicates with the second control unit, wherein the first control unit monitors if there is an internal device failure in the second circuit breaker 2, wherein the first control unit changes its standard tripping characteristics to emergency tripping characteristics when the internal device failure of the second circuit breaker 2 is detected.

Further, an electrical distribution grid comprising a circuit breaker system 3 is provided, wherein the first circuit breaker is located upstream from the second circuit breaker 2.

As a result, the circuit breaker system 3 fulfils the object and has the advantage, that a safe operation is achieved. As a result of that the first control unit monitors via means for communication if there is an internal device failure in the second circuit breaker 2, wherein the first control unit is adapted to change its standard tripping characteristics to emergency tripping characteristics when the internal device failure of the second circuit breaker 2 is detected. The internal device failure can be detected in an effective and fast way and a complete system failure can be avoided. The defective circuit breaker 2 can be prevented from harmfully blowing up and damaging surrounding components in the closure. Therefore, the safety level of the circuit breaker system 3 is not reduced and the overall system uptime can be extended.

A circuit breaker system 3 is a system comprising at least two circuit breakers 1, 2. A trip unit is the part of a circuit breaker 1, 2 that opens the circuit in the event of a thermal overload, a short circuit, a ground fault or other reasons. The trip unit may be an electromechanical or an electronic trip unit. The first control unit controls the first trip unit and the second control unit controls the second trip unit. The sensor may be a thermal or electrical sensor.

The circuit breaker system 3 comprises means for communication of the the first control unit with the second control unit. Said means may be a Modbus RTU, a fieldbus, a wireless communication or a hardwired communication. Hereby the trip enable signal can be connected to the trip electronic.

The first control unit monitors via said means for communication if there is an internal device failure in the second circuit breaker 2. Further, the first control unit is adapted to change its standard tripping characteristics to emergency tripping characteristics when the internal device failure of the second circuit breaker 2 is detected.

The internal device failure is especially a circuit breaker internal failure and it may particularly occur, that the second control unit has a malfunction or is damaged, the switch may be malfunctioning, a microcontroller may be malfunctioning, the sensor could be malfunctioning or the temperature of one or more components is too high to ensure a safe operation of the circuit breaker.

In general, a circuit breaker 1, 2 is an automatically operated electrical device which is designed to protect an electrical circuit from damage caused by excess current from an overload or short circuit.

The present invention may be implemented in all common circuit breaker systems. Therefore, in the following description, the term circuit breaker 1, 2 may comprehensively refer to a miniature circuit breaker (MCB), a hybrid circuit breaker (HCB) or a solid state circuit breaker (SSCB) or a residual current device (RCD) or a residual current operated circuit breaker with overcurrent protection (RCBO) or an arc fault detection device (AFDD). The residual current device may be a residual-current circuit breaker (RCCB).

In particular, the first control unit comprises at least two predefined tripping characteristics. Said tripping characteristics are saved in the first control unit. Said first control unit always uses one of said tripping characteristics, wherein one of said tripping characteristics is the standard tripping characteristic which is used if there are no internal device failures. Another one of said tripping characteristics is the emergency tripping characteristic which is used instead of said standard tripping characteristic in case of an internal device failure.

Preferably, the first control unit comprises further emergency tripping characteristics for third circuit breakers which exhibit different tripping characteristics as the second circuit breakers 2. Said third circuit breakers may have a different current rating than the second circuit breakers 2.

According to a preferred embodiment, the second control unit has means to detect internal device failures in the second circuit breaker 2 and if an internal device failure is being detected by the second control unit, said second control unit communicates the internal device failure of the second circuit breaker 2 to the first control unit. Preferably, the first control unit is adapted to change its standard tripping characteristics to emergency tripping characteristics when the internal failure of the second circuit breaker 2 is communicated.

It can be preferred, that said internal device failure is communicated if the device itself has faults or malfunctions and the fault could happen anywhere within the circuit breaker 2. Further, the internal device failure is preferably a downstream internal device failure in the second circuit breaker 2.

The first circuit breaker 1 and the second circuit breaker 2 can preferably comprise one or more microcomputers.

The first circuit breaker 1 and the second circuit breaker 2 can preferably be remote programmable circuit breakers 1, 2.

According to another preferred embodiment, the first control unit is adapted to continuously poll the second circuit breaker 2 to detect an internal device failure of the second circuit breaker 2. Such a system could be referred to as a watchdog system. Preferably, the first circuit breaker 1 emits a signal which is replied by the second circuit breaker 2 and if the second circuit breaker 2 doesn't reply the signal, a malfunction or rather an internal device failure of the second circuit breaker 2 is recognized by the first circuit breaker 1.

Preferably, if an internal device failure of the second circuit breaker 2 is being detected by the second control unit or the first control unit, the second circuit breaker 2 doesn't trip. It can be preferred, that the second circuit breaker 2 enters an emergency mode where the tripping unit of the second circuit breaker 2 is disabled. By doing so, the defective second circuit breaker 2 is prevented from harmfully blowing up and damaging its surrounding components.

According to another preferred embodiment, the second circuit breaker 2 has at least a semiconductor power-switch. Preferably, the at least one semiconductor switch is monitored by the first control unit and/or the second control unit for a malfunction, in particular for an internal device failure.

According to another preferred embodiment, the standard tripping characteristics and the emergency tripping characteristics comprise tripping currents regarding overcurrent or short circuit current thresholds and/or residual current thresholds. Said tripping currents and/or residual current thresholds are preferably predefined.

According to another preferred embodiment, the emergency tripping characteristics of the first control unit particularly comply with the tripping characteristics of the second control unit. Therefore, the tripping characteristics can be delegated in an easy way.

As told before, an electrical distribution grid comprising a circuit breaker system 3 is provided, wherein the first circuit breaker is located upstream from the second circuit breaker 2. Said electrical distribution grid has at least one power line 4 which is monitored by the first circuit breaker 1 and the second circuit breaker 2 in serial. Therefore, the first circuit breaker 1 is preferably an upstream circuit breaker and the second circuit breaker 2 is preferably a downstream circuit breaker. An upstream circuit breaker is closer to an electrical power plant and a downstream circuit breaker is closer to the consumer. An upstream circuit breaker usually has a higher current rating and tripping time to achieve selectivity in the downstream hierarchy.

Referring to a preferred embodiment which is illustrated in FIG. 1, the first circuit breaker 1 is connected to a plurality of second circuit breakers 2. The power line 4 may comprise branches.

Further, in order to enhance the chances of failure detection by a user, it can be preferred, that upon detection of an internal device failure, the first control unit or the second control unit outputs a failure message to inform the user about a malfunction. The failure message may be a text message which is output on a screen or the failure message may be output via optical means like a flashing lamp.

As told before, an exemplary embodiment of a preferred circuit breaker system 3 is illustrated in FIG. 1. It comprises a first circuit breaker 1, in particular an upstream circuit breaker connected to a plurality of second circuit breakers 2, in particular downstream circuit breakers. Such a system with downstream and upstream circuit breakers is usually referred to as a hierarchical circuit breaker system or structure.

For example, if an internal device failure of one of the second circuit breakers 2 is detected by the control unit of the first circuit breaker 1, the first control unit changes its standard tripping characteristics to emergency tripping characteristics.

In a preferred embodiment, the trip can be delegated from the second circuit breaker 2 to the first circuit breaker 1, therefore from the downstream circuit breaker to the upstream circuit breaker. This delegation could be achieved using hardwires connected directly to the upstream trip mechanism or using some advanced communication interfaces like a fieldbus or a wireless communication.

Alternatively, if a second circuit breaker 2, in particular a downstream circuit breaker, detects an internal device failure before an additional system failure happens, it preferably delegates its own tripping characteristics to the first circuit breaker 1, in particular the upstream circuit breaker. For example, if the downstream circuit breaker has a tripping threshold at 16 A and the upstream circuit breaker has a tripping threshold at 40 A, the upstream circuit breaker can take over the tripping threshold of 16 A and replace the downstream circuit breaker. Further, the system operator is preferably informed and a safe and uptime system is ensured.

According to another preferred embodiment, the safety level of the circuit breaker system 3 can be increased even more by additionally implementing a life guard system. Preferably, the first circuit breaker 1 periodically polls the at least one second circuit breaker 2 for its status. In case one second circuit breaker 2 doesn't answer, the first circuit breaker 1 preferably enters an emergency mode and takes over the tripping characteristics of the non-responding second circuit breaker 2 according to a predefined emergency plan or a general emergency characteristic.

An alternative implementation could preferably use life guard messages automatically sent from the at least one second circuit breaker 2, in particular downstream devices. In case the first circuit breaker 1, in particular the upstream circuit breaker, doesn't receive said messages from its at least one second circuit breaker 2 for a predefined number of times, it could as well enter the before-mentioned emergency mode.

It can be preferred, that the circuit breaker system 3 and hence the electrical distribution grid comprises at least one, preferably a plurality of first circuit breakers 1 and a plurality of second circuit breakers 2.

While the present invention has been particularly shown and described with reference to exemplary embodiments thereof, it will be understood by those skilled in the art that various changes in form and details may be made therein without departing from the spirit and scope of the present invention as defined by the appended claims. The exemplary embodiments should be considered as descriptive only and not for purposes of limitation. Therefore, the scope of the present invention is not defined by the detailed description but by the appended claims.

Hereinafter are principles for understanding and interpreting the actual disclosure.

Features are usually introduced with an indefinite article "one, a, an". Unless otherwise stated in the context, therefore, "one, a, an" is not to be understood as a numeral.

The conjunction "or" has to be interpreted as inclusive and not as exclusive, unless the context dictates otherwise. "A or B" also includes "A and B", where "A" and "B" represent random features.

By means of an ordering number word, for example "first", "second" or "third", in particular a feature X or an object Y is distinguished in several embodiments, unless otherwise defined by the disclosure of the invention. In particular, a feature X or object Y with an ordering number word in a claim does not mean that an embodiment of the invention covered by this claim must have a further feature X or another object Y.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A circuit breaker system comprising:
a first circuit breaker and a second circuit breaker, the first circuit breaker having a first trip unit, a first control unit and a first electrical sensor, wherein the first control unit is configured to control the first trip unit, the second circuit breaker having a second trip unit, a second control unit and a second electrical sensor, wherein the second control unit is configured to control the second trip unit, wherein the first circuit breaker is located electrically closer to an electric power supply compared to the second circuit breaker, and wherein the first circuit breaker has a first current rating that is higher than a second current rating of the second circuit breaker; and a communication device configured for communication of the first control unit with the second control unit, wherein the first control unit is configured to monitor via the communication device for an internal device failure in the second circuit breaker, wherein the first control unit is configured to change standard tripping characteristics of the first control unit to emergency tripping characteristics based on a detecting of the internal device failure of the second circuit breaker, and wherein changing the standard tripping characteristics of the first control unit to emergency tripping characteristics comprises the first control unit adopting the tripping characteristics of the second control unit.

2. The circuit breaker system according to claim 1, wherein the second control unit is configured to detect internal device failures in the second circuit breaker and based on detecting an internal device failure by the second control unit, the second control unit communicates the internal device failure of the second circuit breaker to the first control unit.

3. The circuit breaker system according to claim 1, wherein the first control unit is configured to continuously poll the second circuit breaker to detect the internal device failure of the second circuit breaker.

4. The circuit breaker system according to claim 3, wherein the first control unit changes the standard tripping characteristics of the first control unit to emergency tripping characteristics based on the first control unit determining that a response is not received from the second circuit breaker to a predetermined number of consecutive poll requests.

5. The circuit breaker system according to claim 1, wherein the second circuit breaker has at least a semiconductor switch.

6. The circuit breaker system according to claim 1, wherein the standard tripping characteristics and the emergency tripping characteristics comprise tripping currents regarding overcurrent or short circuit current thresholds and/or residual current thresholds.

7. The circuit breaker system according to claim 1, wherein the first trip unit of the first circuit breaker is configured to open a circuit in case of at least one of a thermal overload, a short circuit, or a ground fault.

8. The circuit breaker system according to claim 1, wherein the second trip unit of the second circuit breaker is configured to open a circuit in case of at least one of a thermal overload, a short circuit, or a ground fault.

9. The circuit breaker system according to claim 1, wherein the first circuit breaker has a first tripping time that is higher than a second tripping time of the second circuit breaker.

10. The circuit breaker system according to claim 1, wherein the first circuit breaker and the second circuit breaker are connected in series.

11. The circuit breaker system according to claim 10, wherein the first circuit breaker and the second circuit breaker are arranged such that current received from the electric power supply flows through the first circuit breaker before flowing through the second circuit breaker.

12. A method for operating a circuit breaker system, the circuit breaker system comprising a first circuit breaker and a second circuit breaker, the first circuit breaker having a first trip unit, a first control unit and a first electrical sensor, the first control unit being configured to control the first trip unit, the second circuit breaker having a second trip unit, a second control unit and a second electrical sensor, the second control unit being configured to control the second trip unit, wherein the first control unit communicates with the second control unit, wherein the first circuit breaker is located electrically closer to an electric power supply compared to the second circuit breaker, and wherein the first circuit breaker has a first current rating that is higher than a second current rating of the second circuit breaker, the method comprising:

monitoring, by the first control unit, for an internal device failure in the second circuit breaker; and changing standard tripping characteristics of the first control unit to emergency tripping characteristics based on a detecting of the internal device failure of the second circuit breaker, wherein changing the standard tripping characteristics of the first control unit to emergency tripping characteristics comprises the first control unit adopting the tripping characteristics of the second control unit.

13. A circuit breaker system comprising:

a first circuit breaker and a second circuit breaker, the first circuit breaker having a first trip unit, a first control unit and a first electrical sensor, wherein the first control unit is configured to control the first trip unit, the second circuit breaker having a second trip unit, a second control unit and a second electrical sensor, wherein the second control unit is configured to control the second trip unit, and wherein the first circuit breaker is located electrically closer to an electric power supply compared to the second circuit breaker, wherein the first circuit breaker has a first current rating that is higher than a second current rating of the second circuit breaker, and wherein the first circuit breaker has a first tripping time that is higher than a second tripping time of the second circuit breaker; and a communication device configured for communication of the first control unit with the second control unit, wherein the first control unit is configured to monitor via the communication device for an internal device failure in the second circuit breaker, wherein the first control unit is configured to change standard tripping characteristics of the first control unit to emergency tripping characteristics based on a detecting of the internal device failure of the second circuit breaker, wherein changing the standard tripping characteristics of the first control unit to emergency tripping characteristics comprises the first control unit adopting the tripping characteristics of the second control unit.

* * * * *